United States Patent
Ngo et al.

(10) Patent No.: US 11,318,454 B1
(45) Date of Patent: May 3, 2022

(54) METHOD AND SYSTEM FOR RENEWING SPENT FLUID CATALYTIC CRACKING (SFCC) CATALYSTS USING ACID LEACHING AND ACID REFLUX ACTIVITIES

(71) Applicants: Phuong Thuy Ngo, Ha Noi (VN); Nguyen Phuc Le, Ha Noi (VN); Tri Van Tran, Ha Noi (VN); Thinh Huu Tran, Ha Noi (VN); Thuy Ngoc Luong, Ha Noi (VN)

(72) Inventors: Phuong Thuy Ngo, Ha Noi (VN); Nguyen Phuc Le, Ha Noi (VN); Tri Van Tran, Ha Noi (VN); Thinh Huu Tran, Ha Noi (VN); Thuy Ngoc Luong, Ha Noi (VN)

(73) Assignee: Vietnam Petroleum Institute, Ha Noi (VN)

( * ) Notice: Subject to any disclaimer, the term of this patent is extended or adjusted under 35 U.S.C. 154(b) by 0 days.

(21) Appl. No.: 17/486,919

(22) Filed: Sep. 28, 2021

(51) Int. Cl.
| | |
|---|---|
| *B01J 38/62* | (2006.01) |
| *B01J 38/02* | (2006.01) |
| *B01J 38/72* | (2006.01) |
| *B01J 19/00* | (2006.01) |
| *B01D 5/00* | (2006.01) |
| *C10G 11/18* | (2006.01) |

(52) U.S. Cl.
CPC ............ *B01J 38/62* (2013.01); *B01D 5/0063* (2013.01); *B01J 19/0033* (2013.01); *B01J 38/02* (2013.01); *B01J 38/72* (2013.01); *C10G 11/182* (2013.01); *B01J 2219/00051* (2013.01); *B01J 2219/00177* (2013.01); *C10G 2300/70* (2013.01)

(58) Field of Classification Search
CPC . B01J 19/033; B01J 38/02; B01J 38/62; B01J 38/72; B01J 2219/00051; B01J 2219/00177; B01D 5/0063; C10G 11/182; C10G 2300/70
USPC .......................................................... 502/28
See application file for complete search history.

(56) References Cited

U.S. PATENT DOCUMENTS

| | | | | |
|---|---|---|---|---|
| 5,141,904 A | * | 8/1992 | Kubicek ................. | B01J 29/90 502/28 |
| 5,248,408 A | * | 9/1993 | Owen .................... | B01J 8/0055 208/113 |
| 2013/0137913 A1 | * | 5/2013 | Chewter ................. | B01J 29/40 585/638 |

* cited by examiner

*Primary Examiner* — Brian A McCaig

(57) ABSTRACT

A method and system for renewing spent fluid catalytic cracking (SFCC) catalysts are disclosed which comprises: treating SFCC catalysts using a static reactor designed to uniformly distribute with an oxalic acid solution and its reflux to obtain leached SFCC catalysts; washing with aqueous solution and filtering to collect cleaned and treated SFCC catalyst; and c) executing the cleaned and treated SFCC catalyst with thermal treatment to obtain renewed FCC catalysts.

20 Claims, 4 Drawing Sheets

METHOD AND SYSTEM FOR RENEWING SPENT FLUID CATALYTIC CRACKING (SFCC) CATALYSTS USING ACID LEACHING AND ACID REFLUX ACTIVITIES

FIELD OF THE INVENTION

The present invention relates to waste management processes. More particularly, this invention relates to a recovery process for spent fluid catalytic cracking (SFCC) catalysts in petroleum processing plants.

BACKGROUND OF THE INVENTION

One of the largest commercial applications in the petroleum refining process is fluid catalytic cracking (FCC). This cracking process uses high temperature and pressure to split vacuum gas oil/atmospheric residues into more valuable lighter hydrocarbons such as gasoline blend components, liquefied petroleum gas (LPG), diesel and other products. The catalysts used up in the FCC process are called equilibrium catalyst (e-cats). Often, the e-cats are either re-used or disposed of as spent FCC (SFCC) catalyst. One of the disadvantages of the FCC catalyst is its rapid deactivation which occur both reversibly and irreversibly depending on the conditions of uses or pathways. Reversible deactivation happens because side reactions eventually yields coke deposition. Irreversible deactivation happens because contaminants are embedded in the feedstock or in the dealumination of the zeolite catalyst component. Deactivation by coking is normally almost completely reversible by conventional oxidative regeneration at temperatures of 750°–1100° F. The deactivation of FCC catalysts is called spent fluid catalytic cracking (SFCC). When the oxidative regeneration restores less than about 70 percent of the fresh cracking activity, it is necessary to remove a part of such catalyst and replace them with fresh ones.

Those e-cats with low coke deposition are re-used as start-up catalyst or flushing catalyst to reduce losses. Low coke deposition means low metal contaminants content and sufficient accessibility and activity to compensate for losses or as flushing catalyst. E-cats contaminated with a high amount of metal—generally above 4,000 ppm for V and 20,000 for Ni—is not suitable for re-use in FCC.

It was estimated that ca. 840,000 tons of spent fluid catalytic cracking (SFCC) were discarded per year. Conventionally, the major applications of SFCC catalysts include their use as sands and cements for raw materials in concrete and mortar production. Other minor applications include their use as catalysts for plastic and biomass pyrolysis and gasification for production of synthetic fuels. Despite of their importance, these processes have not been widely developed in industrial scale. The landfills of SFCC catalysts become costly and prohibitive because of the high concentration of nickel (Ni) in SFCC catalysts. Eco toxicity, bioaccumulation, and contamination of ground water by these metals are major concerns to human health. Disposal to landfills or use for concrete blend is still the main choice for the handling of SFCC catalysts. Consequently, the contents of rare earths elements and other valuable metals like vanadium (V) and nickel (Ni) are also lost in the landfills.

Concerning recovery and rejuvenation of SFCC catalysts, further researches are needed to find reliable methods. Currently, no effective techniques are available in the industrial scale. Direct reuse as catalyst in other industrial processes has very limited applications, and in lab or pilot-scale only; for instance, SFCC catalysts were used as catalysts for plastic and biomass pyrolysis/gasification or to produce synthetic fuels. Nonetheless, such processes were not widely used in the industry. Thus, there have been many attempts to regenerate and recycle SFCC catalysts but none have achieved the desired results, especially in the industrial scale.

In the U.S. Pat. No. 5,182,243 ("the '243 Patent"); entitled "Process for Preparing Fluidized Cracking Catalyst from Equilibrium Fluidized Cracking Catalysts", filed in Nov. 1, 1991, and issued in Jan. 26, 1993, to Brown et al.; a process for reuse or recycling of FCC equilibrium catalysts is disclosed. The process of the '243 Patent involves the treatment of a zeolite-containing equilibrium catalyst (e-cat) with a source of silica, sodium oxide, water and an aqueous solution of clear amorphous seeds in temperature in range of 160° F. to 230° F., in order to re-grow zeolite-Y ($Me_2/xO.Al_2O_3.nSiO_2.mH_2O$) in the pores of the matrix of FCC microspheres. However, the method of the '243 patent only concerns with the conversion of a spent FCC (SFCC) into an FCC catalyst containing zeolite without paying attention to (a) the recovery of metals and rare earth elements and (b) to the improvement of the efficiencies of the system.

In another U.S. Pat. No. 4,686,197 ("the '197' patent") entitled "Catalyst Demetallization and Process for Using Demetallized Catalyst", filed in Jul. 2, 2986, issued in Aug. 11, 1987 to Elvin; processes for de-metallizing a catalyst contaminated with at least one contaminant metal such as vanadium (V), nickel (Ni), iron (Fe), etc. and re-use of the de-metallized (e-cat) are disclosed. Although some activities have been recovered by these two processes, the regenerated and recycled catalysts still perform well below the fresh catalysts.

The '197 patent and the '243 patent both concerned with catalytic activity recovery and none to the metal or rare earth element recovery. These disadvantages become benefits for the remaining number of acid site (Al content), Rhenium (Re) content while contaminant V, Fe, Ni removal.

Yet in another U.S. Pat. No. 8,614,158 ("the '158 patent"); entitled "Methods of Re-Using a Spent FCC Catalyst", filed on Aug. 13, 2012, and issued on Dec. 24, 2013 to Vierheilig; the re-using of a spent FCC catalyst method including the steps of providing FCC catalyst that has been utilized in an FCC process are disclosed. The reaction of the spent FCC catalyst with an extracting agent such as nitric acid is also disclosed. Other extracting agents such as hydrochloric acid, maleic acid, formic acid, sulfuric acid, acetic acid, ammonium citrate, and ammonium hydroxide, etc., at pH of solution from 6 to 8, and at the temperature from 45° C. to 130° C. were also used. After performing the reacting step, the reacted spent FCC catalyst can be used in an additional FCC process. The '158 patent attempted to recover some of the metals in the SFCC but failed to improve the overall efficiencies of the system. This is because heating up acids in a closed environment can break the catalyst particles, hampering the objectives of the '158 patent. In many situations, heating acids in a closed system can be dangerous.

Another process for upgrading an e-cat is illustrated in the US Patent Pub. No. 2008/0210599; entitled "Process for Upgrading an FCC Equilibrium Catalyst"; filed on Jan. 6, 2006; to O'Connor et al. (hereinafter referred to as "the '599 patent publication"). The disclosed process of the '599 patent publication comprises the steps of (a) treating an e-cat that contains alumina and zeolite with an acidic solution such as treating an FCC equilibrium catalyst with an acidic solution, wherein the acidic solution includes nitric acid, hydrochloric acid (HCl), sulphuric acid ($H_2SO_4$), acetic acid, oxalic acid and formic acid to obtain an acid-treated equilibrium catalyst, at the temperature from 20 to 250° C., preferably 60 to 180° C.; in a time period from 30 minutes to 24 hours, and most preferably 30 minutes to 6 hours; and pH of this solution preferably is at least 2; (b) contacting the acid-treated equilibrium catalyst with an aqueous solution or suspension of a divalent metal compound; and c) adjusting the pH of the mixture obtained in step b) to above 7, drying and calcining the acid-treated equilibrium catalyst at temperature in the range of about 200 to about 1000° C., preferably from 300-800° C. However, the method of the '599 patent did not concern with the safety, the efficiency, and the preservation of the catalyst particles.

In summary, there are no patents and non-patent literatures mentioned the reactivating method without breaking catalyst particles. When the FCC catalyst particle size decreases, it is impossible to reuse in FCC unit without adding the re-granulation step (See References).

Therefore, what is needed is system at industrial scale and method for reactivating of SFCC that can recover metals and rare earth elements impregnated in the SFCC catalysts.

What is needed is a system at industrial scale and a safe method for reactivating of SFCC using acid leaching.

What is needed is a system at industrial scale and method for reactivating of SFCC that is efficient and cost effective.

The present invention meet above long-felt needs and market demands.

SUMMARY OF THE INVENTION

The present invention has been made in view of the aforementioned circumstances, and therefore, an object of the present invention is to provide a novel method and an industrial-scaled SFCC recovery system designed to renew SFCC, to recover metals and other rare earth elements, and to achieve safety and cost-effective.

Accordingly, an object of the present invention is to provide a method for renewing spent fluid catalytic cracking (SFCC) catalysts, comprising: a) treating SFCC catalysts using a static reactor designed to uniformly distribute with an oxalic acid solution and its reflux to obtain leached SFCC catalysts; b) washing with aqueous solution and filtering to collect cleaned and treated SFCC catalyst; and c) executing the cleaned and treated SFCC catalyst with thermal treatment to obtain renewed FCC catalysts.

Another object of the present invention is to provide a system for reactivating (renewing) of spent fluid catalytic cracking (SFCC) catalysts, comprising: a) a recovery reactor including transverse and longitudinal plates that divide the recovery reactor into smaller columns; an array of acid dispensing tubes and array of acid of reflux dispensing tubes to uniformly distribute organic acid solution to each column; b) a washing and filtering chamber operative to wash and filter the treated SFCC catalysts; c) a thermal chamber operative to dry and calcite the cleaned SFCC catalysts to obtain the final renewed FCC catalysts ready to reuse.

Another object of the present invention is to improve the efficiency of acid leaching by increasing contact between the SFCC catalyst particles and oxalic acid solution and control the acid concentration, the ratio of SFCC catalyst/oxalic acid, temperature of acid leaching process.

Another object of the present invention is to limit the breaking of SFCC catalyst particles.

Another object of the present invention is to provide a simple and low-cost method for converting SFCC catalysts into flushing cats, thus resulting in partial removal of metal impurities, insignificant reduction of catalyst particle size, avoidance of additional granulation process.

Another object of the present invention is to recover the activities of SFCC catalysts with a static reactor that operates similar to fluidized bed reactors.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
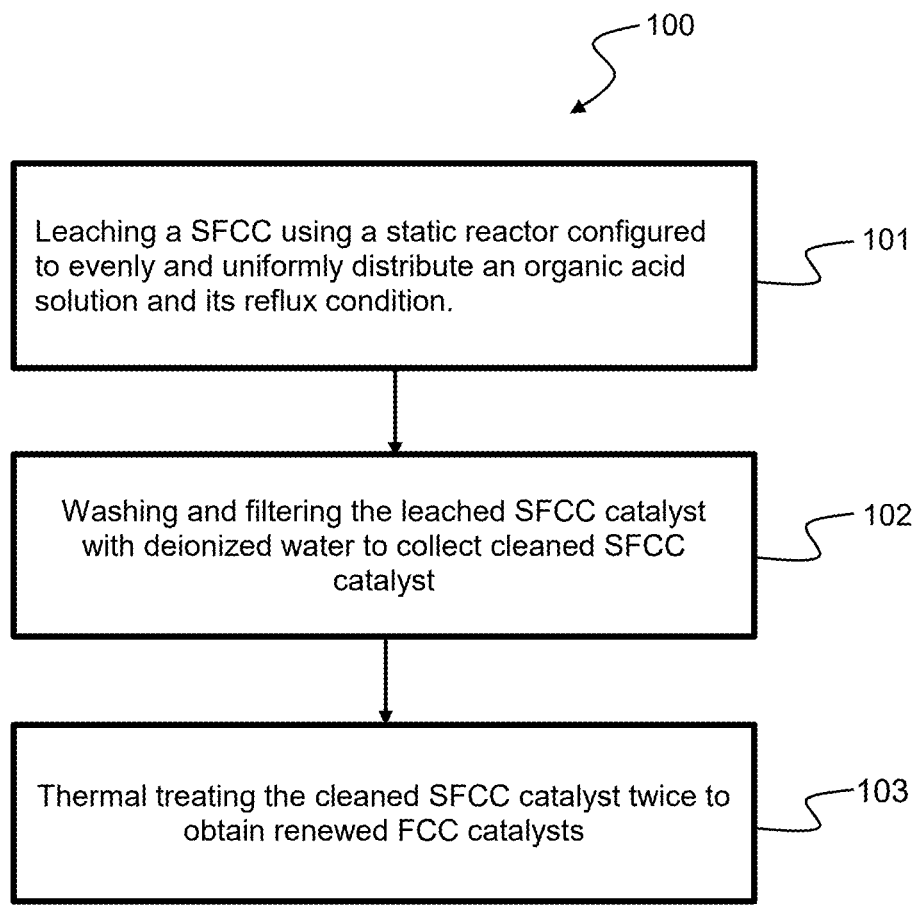
FIG. 1 is a flowchart illustrating a method for reactivating of spent fluid catalytic cracking (SFCC) catalyst which is safe, cost-effective, and efficient in accordance with an exemplary embodiment of the present invention.

An aspect of the invention is now described with reference to FIG. 1. FIG. 1 illustrates a process 100 of activating of spent fluid catalytic cracking (SFCC) catalyst in accordance with an exemplary embodiment of the present invention. At first, process 100 employs acid leaching and reflux condition to remove contaminant metals and possibly rare earth elements from the SFCC catalysts. Next, the leached SFCC catalysts are washed with an aqueous solution to remove the contaminants and to clean the leached SFCC from leachates. Then, the treated SFCC catalysts are treated with heat.

At step 101, spent fluid catalytic cracking catalysts are treated with an organic acid solution under reflux condition to extract contaminant metal as Ni, V and at least a portion rare earth element and no more than half of the aluminum. The materials withdrawn from a fluid catalytic cracking (FCC) unit after refinery process are called equilibrium catalysts (e-cat). E-cat can be either re-used or disposed of as spent FCC (SFCC) catalyst. E-cat still having a low metal contaminants content and sufficient accessibility (low coke deposition) and activity can be re-used in the FCC unit as start-up catalyst, to compensate for losses or as flushing catalyst. In many aspects of the present invention, the SFCC catalysts with a high amount of metal (generally above 4,000 ppm for V and 20,000 for Ni) are used in order to optimize the realization of step 101. In addition, SFCC catalysts which have particle sizes of more than 40 micrometers and above are selected to undergo such acid leaching process of step 101. In that case, the attrition of the acid leaching and refluxing at high temperature does not adversely affect the average particle size of the SFCC catalysts.

In many aspects of the present invention, the organic acid solution in step 101 is oxalic acid solution at elevated temperatures and under reflux condition. In that condition, the acid solution is continuously boiling, circulating and thereby: i) well contact between the catalyst particles and leaching solution, and ii) limit particle breakage leading to a reduction in the size of the catalyst after treatment. It ensures that the treated catalyst can be used industrially without the additional granulation step. In certain embodiments, organic acid solution is selected from either citric acid, oxalic acid, or gluconic acid.

Continuing with step 101, acid concentration employed is in the range of 0.2M to 1.5M, more preferably at 0.35 to 1M, and most preferably 0.45M to 0.55M. The ratio of SFCC catalyst/oxalic acid ratio is selected in the range from 1:4 to 1:6 g/ml. The ratio 1:5 is used. The contact time between SFCC catalysts and oxalic acid or leaching time is intended from 30 to 90 minutes, more preferably in 60 minutes. The pH of this solution is approximately under 3, more preferably in the range from 1 to 2, to favor the best dissolution of metal contaminant in oxalic acid.

Temperature ranges maintained in step 101 are from about 90° C. to about 120° C., often between 100° C. to 110° C. Higher temperatures may lead to excessive acid attack on the surface of particle without any particular benefit with respect to removal of metal contaminants. Lower temperature may decrease metal dissolution. Most preferably, appropriate temperature is at which the first drop of oxalic acid reflux returns. It could vary from 100 to 110° C. depend on its concentration and solid/liquid ratio employed. Circulation water in reflux system to condense oxalic acid is tab water and is controlled at speed 2.5 litres/min.

Referring again to Step 101, in many aspects of the present invention, the acid leaching of the SFCC catalysts under reflux condition is performed in the industrial scale using a recovery reactor capable of distributing and refluxing evenly the organic acid solution to a large mass of SFCC catalysts, thus maximizing the removal of contaminants and protecting the particle sizes.

Next at step 102, the SFCC catalysts of step 101 are washed with aqueous solution and filtered to collect treated SFCC catalyst substantially free of contaminants, rare earth elements, and other impurities such as leachates. As the result of step 102, the treated SFCC catalysts are also cleared of from the extracting agent, i.e., oxalic acid. To realize step 102, any know separation method could be employed, for example filtration such as with a vertical type of vacuum filter, a plate and frame filter, centrifugation, settling, etc. or combination of these methods. In various aspects of the present invention, deionized water is used to wash the SFCC catalysts.

At step 103, the treated SFCC catalysts of step 102 are treated with various heat sources. The thermal treatment of step 103 is performed through drying and calcination prior to reusing the SFCC catalysts. The temperature range for drying is 100° C. to 120° C. for 3 hours. In the calcination step, the temperature range is 500° C. to 600° C. for calcination for 3 hours with ramping rate of 5° C./minute.

EXAMPLES

The following examples are intended to be illustrative of the present invention to teach one of ordinary skill in heart to make and use the invention and are not intended to limit the scope of the invention in any way.

Examples 1-6 (comparative)

These examples demonstrate the effects of concentration of acidic solution on the physicochemical properties and catalytic activity of FCC catalyst. The examples also illustrate the criticality of the process parameters.

SFCC-1 catalyst was provided by a Vietnamese refinery in April 2019. In examples 1-6, each 20 g spent catalyst was treated with 100 ml oxalic acidic solution at different concentration 0.2M, 0.35M, 0.5M, 0.7M, 1M and 1.5M within 60 minutes at 100° C., pH 1.5, in reflux.

The specific surface areas and pore volumes of the catalyst samples were determined by nitrogen adsorption measurement at −196° C. on a Micrometrics TriStar 3020 Micromeritics unit. Samples were prepared using a Micrometrics SmartPrep 065 by degassing under nitrogen flow at 400° C. The zeolite and matrix surface areas were calculated following the ASTM D4365 (2013). The elements content in leachate solution after step i) were determined by ICP method using an ICP-OES spectrometer OPTIMA 2000 DV in order to calculate leaching yield.

TABLE 1

Surface area and pore volume of treated SFCC-1 at different concentration of oxalic acid

| Oxalic acid concentration | SFCC-1 | 0.2 M | 0.35 M | 0.5 M | 0.7 M | 1 M | 1.5 M |
|---|---|---|---|---|---|---|---|
| Example | | 1 | 2 | 3 | 4 | 5 | 6 |
| Total Surface Area (m$^2$/g) | 145 | 150 | 163 | 186 | 217 | 257 | 258 |
| Zeolite Surface Area (m$^2$/g) | 84 | 80 | 85 | 94 | 113 | 150 | 148 |

TABLE 1-continued

Surface area and pore volume of treated SFCC-1 at different concentration of oxalic acid

| Oxalic acid concentration | SFCC-1 | 0.2 M | 0.35 M | 0.5 M | 0.7 M | 1 M | 1.5 M |
|---|---|---|---|---|---|---|---|
| Matrix Surface Area (m²/g) | 61 | 69 | 78 | 92 | 103 | 107 | 110 |
| Total pore volume (cm³/g) | 0.16 | 0.15 | 0.16 | 0.18 | 0.20 | 0.22 | 0.23 |

As can be seen from the above results, all treated SFCC-1 have higher surface area in both terms zeolite SA and matrix SA. Higher concentration of oxalic acid treats, higher surface area treated SFCC-1 catalyst obtained. The SA increasing trend stops at oxalic acid 1M, at 1.5M the surface area remains unchanged compared to 1M.

Comparing the element content between SFCC-1 and treated SFCC, the higher oxalic acid concentration was applied the more element content in FCC catalyst decreased. However, the main composition of FCC catalyst was well remained, at highest concentration, 1M, $Al_2O_3$ content dropped only 12% and $Re_2O_3$ declined by roughly 35%. The elements content found in the extracted solution after acid treated step was shown in table 3. These two results related treated SFCC and leachate solution were well correlated. As mentioned before, V and Fe strongly dissolute in oxalic acid solution (at 1M, nearly 90% V and 67% Fe dissolute) while La and Al have limited dissolution. The dissolution of the main composition is inevitable during leaching process and it highly dependent on the type, concentration of acid used, leaching time, as well as associated leaching techniques.

Figure 2:
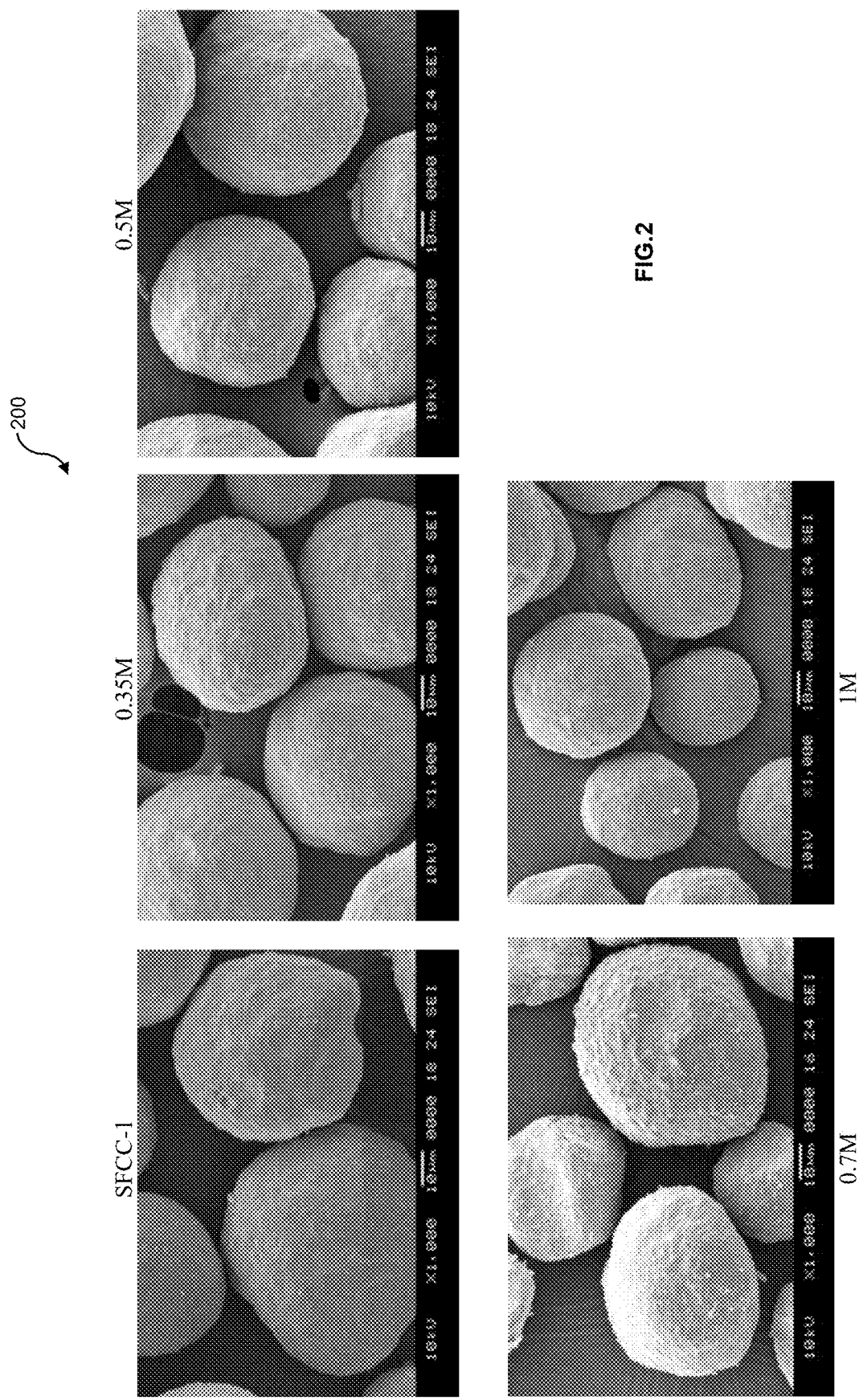
FIG. 2 is a SEM images of treated SFCC at different concentration of oxalic acid show significant intact in particle sizes in accordance with an exemplary embodiment of the present invention.

Referring to FIG. 2, SEM images 200 of treated SFCC at different concentration of oxalic acid show significant intact in particle sizes in accordance with an exemplary embodiment of the present invention SEM images of treated SFCC at different concentration of oxalic acid were taken by Carl Zeiss EVO MA10 at the same magnification ×1000 and under 10 kV voltage. The size of catalysts particle does not change much but the noodles on the surface disappeared due to the dissolution of iron.

TABLE 2

Elements content in treated SFCC at different concentration of oxalic acid

| Oxalic acid concentration | SFCC-1 | 0.35M | 0.5M | 0.7M | 1M |
|---|---|---|---|---|---|
| Example | | 2 | 3 | 4 | 5 |
| Ni, ppm | 6209 | 5924 | 5861 | 5639 | 5227 |
| V, ppm | 652 | 441 | 348 | 308 | 244 |
| Fe, wt % | 0.47 | 0.44 | 0.42 | 0.39 | 0.37 |
| Na, wt % | 0.19 | — | — | — | — |
| CaO, wt % | 0.21 | 0.18 | 0.16 | 0.13 | 0.12 |
| La₂O₃, wt % | 2.53 | 2.20 | 2.04 | 1.70 | 1.65 |

TABLE 2-continued

Elements content in treated SFCC at different concentration of oxalic acid

| Oxalic acid concentration | SFCC-1 | 0.35M | 0.5M | 0.7M | 1M |
|---|---|---|---|---|---|
| Al₂O₃, wt % | 51.7 | 50.24 | 48.10 | 44.84 | 45.41 |
| SiO₂, wt % | 32.4 | 31.2 | 32.0 | 31.5 | 31.8 |

TABLE 3

Elements content in extracted solution at different concentration of oxalic acid.

| Oxali acid concentration | 0.35M | 0.5M | 0.7M | 1M |
|---|---|---|---|---|
| Example | 2 | 3 | 4 | 5 |
| V, ppm | 242 | 314 | 347 | 426 |
| Fe, ppm | 1119 | 1748 | 2568 | 3222 |
| Ni, ppm | 157 | 278 | 407 | 578 |
| La, ppm | 400 | 966 | 1768 | 1218 |

A short contact time micro activity testing unit (SCT-MAT) licensed by Grace Davison was used to evaluate the performance of treated SFCC. The feedstock used for cracking reaction was provided by a Vietnamese Refinery. The cracking reaction was performed at 520° C., cat to oil 1.5 with a contact time of 12 s. Gaseous products were analyzed using 7890 A GC system from Agilent Technologies. The boiling range distribution of the liquid products was analyzed by simulated distillation according to ASTM D2887. The coke on catalyst was also analyzed using a CS600 from Leco. The conversion is determined as follow:

Conversion=100%−wt % of LCO (light cycle oil)−wt % of HCO (heavy cycle oil)

Compared with SFCC-1, example 1 to 6 have all higher conversion and products yields. It is clearly seen that 0.5M oxalic acid has a large effect on conversion and selectivity. Conversion has increased from 44.1 wt. % to 77.1 wt. % and the gasoline yield rose from 31.3 to 48.7 wt. %. Over 0.5M oxalic acid, catalytic activity and product yield show dramatically decrease. Conversion and LPG yield diminish roughly 25 and 9 wt. % respectively when acidic concentration increases from 0.5 to 1.5M.

TABLE 4

Cracking activity and product yield of treated SFCC at different concentration of oxalic acid

| Oxalic acid concentration | SFCC-1 | 0.2 M | 0.35 M | 0.5 M | 0.7 M | 1 M | 1.5 M |
|---|---|---|---|---|---|---|---|
| Example | | 1 | 2 | 3 | 4 | 5 | 6 |
| Conversion, wt. % | 44.1 | 55.7 | 61.26 | 77.1 | 53.8 | 52.5 | 51.4 |

TABLE 4-continued

Cracking activity and product yield of treated SFCC at different concentration of oxalic acid

| Oxalic acid concentration | SFCC-1 | 0.2 M | 0.35 M | 0.5 M | 0.7 M | 1 M | 1.5 M |
|---|---|---|---|---|---|---|---|
| $H_2$, wt. % | 0.11 | 0.09 | 0.089 | 0.11 | 0.08 | 0.11 | 0.12 |
| Ethylene, wt. % | 0.31 | 0.51 | 0.6 | 0.68 | 0.53 | 0.52 | 0.42 |
| Propylene, wt. % | 2.69 | 4.65 | 5.88 | 7.8 | 4.96 | 5.15 | 5.32 |
| Total gas, wt. % | 10.2 | 15.5 | 19.64 | 25.5 | 16.3 | 16.1 | 15.8 |
| Dry gas, wt .% | 1.02 | 1.27 | 1.35 | 1.59 | 1.22 | 1.25 | 1.14 |
| LPG ($C_3$, $C_4$), wt. % | 9.14 | 15.2 | 18.28 | 23.9 | 15.1 | 14.8 | 14.7 |
| Gasoline, wt. % | 31.3 | 36.3 | 38.77 | 48.7 | 34.6 | 31.6 | 32.8 |
| LCO, wt. % | 26.8 | 13.9 | 18.28 | 16.9 | 20 | 20.2 | 21 |
| HCO, wt. % | 29.1 | 30.4 | 20.46 | 6.03 | 26.2 | 27.2 | 27.6 |
| Coke, wt. % | 2.7 | 3.87 | 2.85 | 2.85 | 2.87 | 4.8 | 2.83 |

Example 7

This example determinates the effect of the oxalic acid treatment process in this invention to another SFCC-2 catalyst which were discarded from a Japanese refinery. That SFCC-2 catalyst was treated in the same condition with one in example 3 to compare.

Example 3 and example 7 have same trend of surface area and cracking activity. After treatment, SFCC-1 and SFCC-2 have all higher surface area in zeolite term as well as matrix term. The same rising trend in cracking conversion was observed in example 7, it increased from 46.4 wt. % to 74.3 wt. %. Bottom cracking was highly improved, HCO yield dropped by approximately 23 wt. % for SFCC-2. The other beneficial products as gasoline and LPG had also a significant increase.

TABLE 5

Surface area and cracking activity of 2 different SFCC at the same leaching condition

| Samples | SFCC-1 | Treated SFCC-1 | SFCC-2 | Treated SFCC-2 |
|---|---|---|---|---|
| Example | | 3 | | 7 |
| Total Surface Area (m²/g) | 145 | 186 | 140 | 193 |
| Zeolite Surface Area (m²/g) | 84 | 94 | 116 | 138 |
| Matrix Surface Area (m²/g) | 61 | 92 | 24 | 55 |
| Conversion, wt. % | 44.1 | 77.1 | 46.4 | 74.3 |
| $H_2$, Wt. % | 0.11 | 0.11 | 0.10 | 0.09 |
| Propylene, wt. % | 2.69 | 7.8 | 2.32 | 9.06 |
| Total gas, wt. % | 10.2 | 25.5 | 9.43 | 28.80 |
| Dry gas, wt. % | 1.02 | 1.59 | 0.77 | 1.48 |
| LPG ($C_3$, $C_4$), wt. % | 9.14 | 23.9 | 8.66 | 27.32 |
| Gasoline, wt. % | 31.3 | 48.7 | 34.55 | 42.62 |
| LCO, wt. % | 26.8 | 16.9 | 21.35 | 17.02 |
| HCO, wt. % | 29.1 | 6.03 | 32.26 | 8.71 |
| Coke, wt. % | 2.7 | 2.85 | 2.40 | 2.85 |

Examples 8-10

This three examples and example no 3 illustrate the effect of leaching time under reflux in this invention. In these three examples, SFCC-1 catalyst was treated in the same condition with one in example 3 except leaching time, 60 mn replaced to 15 mn, 30 mn and 90 mn. Surface area and cracking activity of these examples are shown in Table 5.

TABLE 6

Surface area and cracking activity of treated SFCC-1 at different leaching time

| Samples | SFCC-1 | 15 mn | 30 mn | 60 mn | 90 mn |
|---|---|---|---|---|---|
| Example | | 8 | 9 | 3 | 10 |
| Total Surface Area (m²/g) | 145 | 196 | 193 | 186 | 184 |
| Zeolite Surface Area (m²/g) | 84 | 105 | 102 | 94 | 96 |
| Matrix Surface Area (m²/g) | 61 | 91 | 91 | 92 | 88 |
| Conversion, wt. % | 44.1 | 59.5 | 61.1 | 77.1 | 52.9 |
| $H_2$, Wt. % | 0.11 | 0.09 | 0.08 | 0.11 | 0.07 |
| Propylene, wt. % | 2.69 | 6.2 | 6.2 | 7.8 | 4.6 |
| Total gas, wt. % | 10.2 | 20.9 | 21.1 | 25.5 | 15.3 |
| Dry gas, wt. % | 1.02 | 1.45 | 1.53 | 1.59 | 1.17 |
| LPG ($C_3$, $C_4$), wt. % | 9.1 | 19.5 | 19.7 | 23.9 | 14.2 |
| Gasoline, wt. % | 31.3 | 35.8 | 37.4 | 48.7 | 34.7 |
| LCO, wt. % | 26.8 | 16.9 | 17.0 | 16.9 | 19.2 |
| HCO, wt. % | 29.1 | 23.6 | 21.9 | 6.0 | 27.9 |
| Coke, wt. % | 2.7 | 2.7 | 2.6 | 2.8 | 2.8 |

Similar to Example 3, all three examples 8, 9 and 10 have higher cracking conversion than SFCC-1 thanks to improvement of pore structure, in both term of zeolite and matrix surface area. All beneficial products yield as propylene, LPG and gasoline reach highest value after 60 minutes and decrease dramatically at longer time.

Examples 11-12

These provided examples give information about the influence of amount of SFCC to volume of oxalic acid ratio in this invention. SFCC/oxalic acid solution ratio 1/4; 1/5 and 1/6 g/ml were applied in SFCC treatment process. The other leaching factors were kept constant: oxalic acid concentration 0.5M, pH 1.5, 60 mn and under reflux condition.

TABLE 7

Surface area and cracking activity of treated SFCC-1 at different SFCC/oxalic acid solution ratio

| Samples | SFCC-1 | 1/4 | 1/5 | 1/6 |
|---|---|---|---|---|
| Example | | 11 | 3 | 12 |
| Total Surface Area (m₂/g) | 145 | 180 | 186 | 189 |
| Zeolite Surface Area (m₂/g) | 84 | 88 | 94 | 95 |
| Matrix Surface Area (m₂/g) | 61 | 92 | 92 | 94 |
| Conversion, wt. % | 44.1 | 58.5 | 77.1 | 64.3 |
| $H_2$, Wt. % | 0.11 | 0.10 | 0.11 | 0.11 |
| Propylene, wt. % | 2.69 | 7.0 | 7.8 | 8.1 |
| Total gas, wt. % | 10.2 | 22.4 | 25.5 | 23.2 |
| Dry gas, wt. % | 1.02 | 1.52 | 1.59 | 1.75 |
| LPG ($C_3$, $C_4$), wt. % | 9.1 | 20.9 | 23.9 | 24.9 |
| Gasoline, wt. % | 31.3 | 33.4 | 48.7 | 36.7 |

TABLE 7-continued

Surface area and cracking activity of treated SFCC-1 at different SFCC/oxalic acid solution ratio

| Samples | SFCC-1 | 1/4 | 1/5 | 1/6 |
|---|---|---|---|---|
| LCO, wt. % | 26.8 | 20.7 | 16.9 | 17.5 |
| HCO, wt. % | 29.1 | 20.7 | 6.0 | 18.7 |
| Coke, wt. % | 2.7 | 2.7 | 2.8 | 2.7 |

In this case, the same trend was observed in cracking conversion and products yield. Collected data at 1:4, 1:5 and 1:6 solid/liquid ratio illustrate a curve, in which, the upper peak obtained at 1:5 ratio.

Example 13

These given examples provide the impact of reflux condition on particle size distribution (PSD) and apparent bulk density (ABD) of treated SFCC compared to agitation method. Example no 13 was carried out at the same condition of sample no 3 except reflux condition, replaced by agitation method. Particle size distribution of samples before and after acid leaching treatment was analyzed by laser light scattering method, following ASTM D4464 and using LS 13 320 from Beckman Coulter. ABD was determined by 25 ml cylinder, according to ASTM D1895 method.

TABLE 8

PSD and ABD of SFCC samples treated in reflux and agitation condition

| Oxalic acid concentration | SFCC-1* | 0.35M | 0.5M Reflux | 0.7M | 0.5M Agitation |
|---|---|---|---|---|---|
| Example | | 2 | 3 | 4 | 13 |
| ABD, g/ml | 0.88 | 0.87 | 0.86 | 0.87 | 0.79 |
| 0-20 μm | 0 | 1.66 | 1.87 | 2.03 | 8.96 |
| 0-40 μm | 6.05 | 8.00 | 8.07 | 9.22 | 23.10 |
| 0-80 μm | 61.30 | 64.30 | 64.30 | 63.60 | 66.20 |
| Mean, μm | 76.44 | 73.91 | 73.58 | 73.97 | 65.66 |

It can be seen that the average particle size (mean value) and ABD of treated SFCC by reflux decrease negligibly than SFCC-1. In contrast, reactivated SFCC by agitation has a significant drop in both APS and ABD value. This fact is due to the different methods applied. In reflux method, the SFCC catalyst is well mixed with oxalic acid by a gentle boiling process, thus limiting the collision of catalyst particles. While in agitation method, under the stirring force, the catalyst particles collide with each other and the wall of the vessel, causing the breakage of particles. Remaining the physio-mechanical properties of FCC catalyst is very useful when it comes to commercial applications by saving re-granulation cost.

Figure 3:
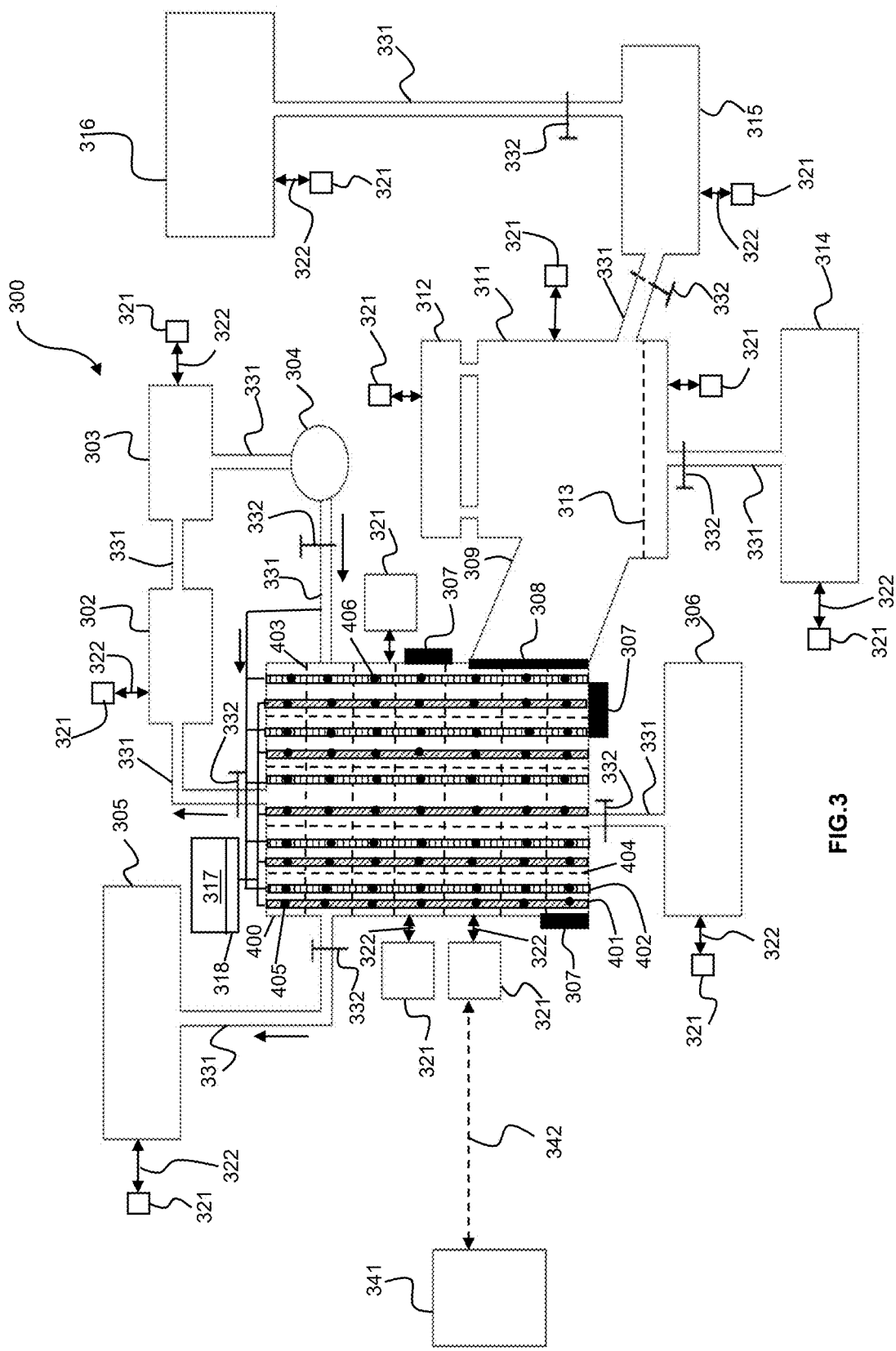
FIG. 3 is a schematic diagram of an industrial scale SFCC reactivating system that includes a recovery unit in accordance with an exemplary embodiment of the present invention.

Now referring to FIG. 3, a schematic diagram of a SFCC catalyst reactivating system 300 ("system 300") designed to implement method 100 in the industrial scale in accordance with an exemplary embodiment of the present invention is illustrated. It is noted that, the schematic diagram discussed here is only a perspective diagram that shows the functions of each unit only. Any structural embodiment that performs the described functions is within the scope of the present invention.

At the center of system 300 is a recovery reactor 400 designed to evenly distribute the organic acid solution and its reflux at high temperature to the SFCC catalysts at the industrial scale. Recovery reactor 400 is in fluid communication to a condenser 302, an acid reflux container 303, and a reflux pump 304. The interior space of recovery reactor 400 is divided into columns by transverse plates 403 and longitudinal plates 404 that are intersected one another. An array of acid tubes 401 with first distributing holes 405 numbered and spaced so that they deliver a predetermined ratio of extracting acids per weight of the SFCC catalysts to each column. The predetermined SFCC catalyst to organic acid solution is 1:4 to 1:6 g/ml. An array of reflux tubes 402 with second distributing holes numbered and spaced so that they maintain the predetermined ratio of extracting acids per weight of the SFCC catalysts to each column. Array of reflux tubes 406 and reflux pump 304 are designed to deliver the reflux rate at 2.5 liters/minutes. Array of acid tubes is connected to an organic acid container 317 and an acid pump 318. In many embodiments of the present invention, organic acid solution is oxalic acid ($C_2H_2O_4$—HOOC—COOH). In the normal condition, oxalic acid is in form of colorless crystalline solid. It is mixed with water to form oxalic acid solution at the selected concentration of 0.2M to 1.5M, 0.35 to 1M, or 0.45M to 0.55M.

Continuing with FIG. 3, with the above design of recovery reactor 400, any ratio of SFCC catalysts to organic acid solution (L/S) and any reflux rate can be achieved. It is noted that the ratio L/S, reaction time, and concentration of the leaching agent are important in the recovery reaction: too much acid and too little acids would render the leaching ineffective. Recovery reactor 400 is also connected to an excess gas tank 305 and a leachate tank 306. Excess gas such as hydrogen ($H_2$) often results when oxalic acid reacts with contaminant metals impregnated in the SFCC catalysts. Heating device 307 are connected to recovery reactor 400 to provide heat to recovery reactor 400. Various types of sensors 321 are connected to recovery reactor 400, condenser 302, reflux tank 303, gas tank 305, and leachate tank 306 via electrical connectors 322. Sensors 321 are IoT-based sensors of different types including, but not limited to, thermal sensors, temperature sensors, and chemical sensors. Electrical connectors 322 are either wired or wireless electrical connectors. Stainless steel fluid tubes 331 are used to connector all components as described above and in FIG. 3. The flows of tubes 331 are controlled by IoT-based valve 332. In many aspects of the present invention, recovery reactor 400, condenser 302, acid reflux container 303, and reflux pump 304 are used to implement step 101.

Recovery reactor 400 includes an output door 308 connected to a buffer chamber 311 via a channel 309. Output door 308 is either a mechanical door or an automatic door. A washer 321 and a filter 313 are connected to buffer chamber 311 to wash and filter the SFCC catalysts after the acid leaching process of step 101. In many embodiments of the present invention, washer 321 is a purification apparatus that purifies tab water to generate deionized water or distilled water to neutralize the leached SFCC catalysts of step 101. The purification is either through reverse osmosis or cation/anion resin. A deionization filter—which is cation/anion resin—is used demineralize the tab water. Washer 321 uses reverse osmosis to cut costs in the long-run. Then, the leached SFCC catalysts are rinsed with the deionized water at high pressure. Filter 313 is a carbon filter to eliminate the remainder residues from the leached SFCC catalysts. The residues and waste deionized water are stored in a waste tank 314. After washing and filtering, the cleaned SFCC catalysts are passed to a thermal chamber 315. Again, buffer chamber 311, washer 312, filter 313 are connected together through tubes 331 which are controlled by IoT-based valves 332.

Buffer chamber 311, washer 321, filter 313, and waste tank 314 are used to implement step 102 of the present invention.

Continuing with FIG. 3, thermal chamber 315 treats the cleaned SFCC catalysts in two phases: First, drying at the temperature range of 100° C. to 120° C. for 3 hours. Second, calcining at the temperature range of 500° C. to 600° C. for 3 hours with ramping rate of 5° C./minute. After that, the renewed FCC are passed to an output storage 316 via tubes 331. Thermal chamber 315 is used to implement step 103 of the present invention. Again, thermal chamber 315 and output storage 316 are equipped with IoT-based sensors 322 and electrical communication channels 322. A remote controller 341 is programmed to communicate with IoT-based valves 332 and IoT-based sensors 321 via an electrical communication channel 342. In various embodiments of the present invention, remote controller 341 is a programmable logic controller (PLC) programmed to perform method 100 of the present invention. In other embodiments, remote controller 342 is a computer system/network, a laptop, a cellular phone, and a tablet. Electrical communication channel 342 can be either wireless channels such as Bluetooth, 4G, LTE, 5G, Wi-Fi, Zigbee, Z-wave, radio frequency (RF), Near Field Communication (NFC), or wired such as RS-232, RS-485, USB, or any combinations thereof.

Method 100 and system 300 achieve the following objectives of the present invention:

(1) Reactivation of SFCC catalysts with reflux condition in industrial scale;

(2) Large volume of SFCC catalysts can be reactivated by dividing them into smaller columns; and the acid solution and its reflux is distributed into different locations and different heights in each column by a system of dispensing tubes;

(3) Safe, cost-effective, and efficient reactivating process are achieved without using fluidized bed reactors.

Figure 4:
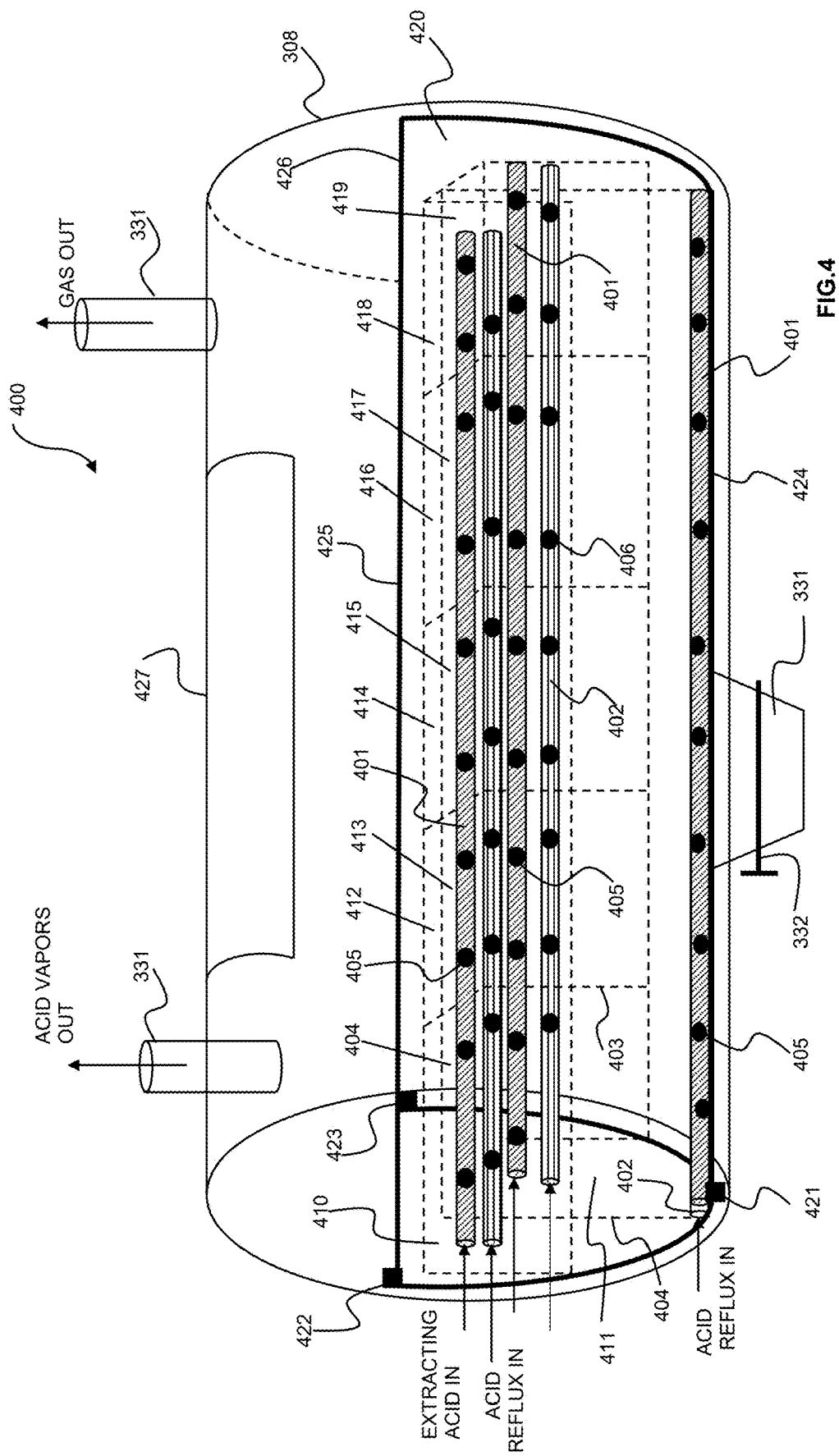
FIG. 4 is a 3D perspective diagram of the recovery unit designed to improve the efficiency of the reactivating activities of the acid leaching and acid reflux operation in accordance with an exemplary embodiment of the present invention.

Next, referring to FIG. 4, a 3D perspective diagram of the recovery reactor 400 designed to improve the efficiency of the reactivating activities of the acid leaching and acid reflux operation in accordance with an exemplary embodiment of the present invention is illustrated.

Recovery reactor 400 is a horizontal cylindrical with a bottom sliding bottom 420 that can slide in and slide out using slider connectors 421-423 and sliding bars 424, 425, and 426. Inside sliding bottom, removable transverse plates 403 and longitudinal plates 404 divide the interior space into an array of smaller columns 410-419. Array of acid tubes 401 and holes 405 and an array of reflux tubes 402 and holes 406 are spanned across the length of recovery reactor 400. In many embodiments of the present invention, array of acid tubes 401 and array of reflux tubes 402 are arranged in pair at different heights: a pair on the bottom of sliding bottom 420; a pair in the middle, and a pair near the top rim of columns 410-419. With this arrangement, organic acid solution and its reflux is distributed evenly and throughout the body of SFCC catalysts in each column. In addition, with this arrangement, static reactivation of SFCC catalysts is used and has the effect of a fluidized bed.

Continuing with FIG. 4, on the top side of recovery reactor 400, an input door 427 is opened in or out to input SFCC catalysts. As being poured in, the SFCC catalysts are automatically divided into smaller columns 410-419. This has the overall effect of reactivating the SFCC catalysts in a smaller and easier to manage volume. Due to the convexity of sliding bottom 420, heavy materials tend to deposit at the bottom of each of columns 410-419. However, dispensing array of acid tubes 401 and array of reflux tubes 402 in the bottom continue to leach the SFCC catalysts, having the effect of a fluidized bed reactor. Drainage tube 331 is in fluid communication to every column 410-419.

Referring again to FIG. 4, during the recovery activity, the following chemical reaction occurs:

$Me^{2+}+H_2-A \rightarrow Me^{2+}-A+2H+$; where $Me^{2+}$ is the contaminant metals such as Fe, Al, Ni, and V. $H_2-A$ is an organic acid solution such as oxalic acid ($C_2H_2O_4$—HOOC—COOH). Oxalic acid is a caustic solution which solubilize metal ions $Me^{2+}$ to form a salt $Me^{2+}-A$ and release hydrogen gas. Tube 331 connected to gas tank at the top side of recovery reactor 400 removes the hydrogen gas. As recovery reactor 400 is heated up to the desired temperature range of 100° C. to 120° C. At this temperature range, oxalic acid is vaporized and escape to the reflux system defined by condenser 302, reflux container 303, and reflux pump 304. Condenser 302 condenses oxalic acid vapors into the liquid form. Condenser 302 uses tab water at 29° C. to condense the vapors of acid oxalic back to the liquid form. Reflux pump 304 pumps the acid reflux back to array of reflux tubes 402.

Finally, after step 101 using system 300 and recovery reactor 400 is complete, leachates and excess water are drained off into leachate tank 306. IoT-based sensors 321 informs controller 341 that step 101 is completed. Door 308 is opened either manually or automatically, sliding bottom 420 is slide out. Transverse plates 403 and longitudinal plates 404 can be removed.

From the above disclosure, the present invention achieves the following:

(1) A desirable FCC-related application for e-cat materials is found.

(2) Examples of activity recovery based on organic acid leaching method which removes part or substantial amount of metal contaminants.

(3) The process of this invention is carried out by treating SFCC catalyst with a source of organic acid solution at elevated temperatures and under reflux condition using a static recovery reactor 400 that uniformly and efficiently distributes the organic acid solution and its reflux.

No attrition and no significant impact on the average particle size of the catalyst after treatment.

Organic acid solution is continuously boiling, circulating, and thoroughly distributed and thereby: i) well contact between the catalyst particles and leaching solution, and ii) limit particle breakage leading to a reduction in the size of the catalyst after treatment. The renewed FCC can be used in the industry without the additional granulation process.

The disclosed flowchart for method 100 and block diagrams 300-400 illustrate the architecture, functionality, and operation of possible implementations of computer program products according to various aspects of controller 341 of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

REFERENCES

(17) Astuti, W., et al., *Comparison of effectiveness of citric acid and other acids in leaching of low-grade Indonesian saprolitic ores*. Minerals Engineering, 2016. 85: p. 1-16.
(18) Behera, B. and S. S. Ray, *Structural changes of FCC catalyst from fresh to regeneration stages and associated coke in a FCC refining unit: A multinuclear solid state NMR approach*. Catalysis Today, 2009. 141(1): p. 195-204.
(19) Bertero, M., et al., *Equilibrium FCC catalysts to improve liquid products from biomass pyrolysis*. Renewable Energy, 2019. 132: p. 11-18.
(20) Cho, S. I., K. S. Jung, and S. I. Woo, *Regeneration of spent RFCC catalyst irreversibly deactivated by Ni, Fe, and V contained in heavy oil*. Applied Catalysis B: Environmental, 2001. 33(3): p. 249-261.
(21) Dewi, M. P., H. T. Petrus, and N. Okibe, *Recovering Secondary REE Value from Spent Oil Refinery Catalysts Using Biogenic Organic Acids*. Catalysts, 2020. 10(9).
(22) Ferella, F., et al., *Spent FCC E-Cat: Towards a Circular Approach in the Oil Refining Industry*. Sustainability, 2019. 11(1).
(23) Ferella, F., V. Innocenzi, and F. Maggiore, *Oil refining spent catalysts: A review of possible recycling technologies*. Resources, Conservation and Recycling, 2016. 108: p. 10-20.
(24) Le, T., et al., *Microwave intensified synthesis of Zeolite-Y from spent FCC catalyst after acid activation*. Journal of Alloys and Compounds, 2019. 776: p. 437-446.
(25) Lin, Y.-H., et al., *Recycling of dual hazardous wastes in a catalytic fluidizing process*. Catalysis Today, 2011. 174(1): p. 37-45
(26) Szymczycha-Madeja, A., *Kinetics of Mo, Ni, V and Al leaching from a spent hydrodesulphurization catalyst in a solution containing oxalic acid and hydrogen peroxide*. Journal of Hazardous Materials, 2011. 186(2): p. 2157-2161.
(27) Talebian-Kiakalaieh, A. and S. Tarighi, *Synthesis of hierarchical Y and ZSM-5 zeolites using post-treatment approach to maximize catalytic cracking performance*. Journal of Industrial and Engineering Chemistry, 2020. 88: p. 167-177.
(28) Yu, H., et al., *Acid-Modified Hierarchical Porous Rare-Earth-Containing Y Zeolite as a Highly Active and Stable Catalyst for Olefin Removal*. ACS Omega, 2020. 5(29): p. 18028-18034.
(29) Guojian Lu, Xinyu Lu, Pei Liu, *Reactivation of spent FCC catalyst by mixed acid leaching for efficient catalytic cracking*, Journal of Industrial and Engineering Chemistry, Volume 92, 2020, Pages 236-242.
(30) Alexandre B., Gérain N., Van Lierde A. (1991) *Recovery of rare earths from spent FCC catalysts*. In: EMC '91: Non-Ferrous Metallurgy—Present and Future. Springer, Dordrecht.
(31) Marafi, M. and A. Stanislaus, *Studies on recycling and utilization of spent catalysts: Preparation of active hydrodemetallization catalyst compositions from spent residue hydroprocessing catalysts*. Applied Catalysis B: Environmental, 2007. 71(3): p. 199-206.
(32) Talebian-Kiakalaieh, A. and S. Tarighi, *Synthesis of hierarchical Y and ZSM-5 zeolites using post-treatment approach to maximize catalytic cracking performance*. Journal of Industrial and Engineering Chemistry, 2020. 88: p. 167-177.

DESCRIPTION OF NUMERALS

302 condenser unit
303 reflux container
304 reflux pump
305 gas (Hydrogen) storage
306 leachate tank
307 heating devices
308 output door
309 output tube
311 buffer tank
312 washer
313 filter
314 waste storage 315 thermal treatment chamber
316 output storage
317 organic acid tank
318 acid pump
321 IoT-based sensors
322 electrical connectors
331 fluid tubes
332 IoT-based valves
341 remote controller such as PLC
342 electrical communication channel
400 recovery reactor
401 array of acid dispensing tubes
402 array of reflux dispensing tubes
403 transverse plates
404 longitudinal plates
405 acid dispensing holes
406 reflux dispensing holes
410-419 columns
420 sliding bottom (to remove treated SFCC catalysts)
421 bottom slider connector
422 left top slider connector
423 right top slider connector
424 bottom sliding bar
425 top left sliding bar
426 top right sliding bar

What is claimed is:

1. A method for recovering a spent fluid catalytic cracking (SFCC) catalyst, comprising:
   (a) treating said SFCC catalyst with an organic acid solution to obtain a leached SFCC catalyst in in a recovery reactor unit using a reflux operation;
   (b) washing said leached SFCC catalyst of said step (a) with deionized water in a buffer unit separate from said recovery reactor unit to remove contaminant metals from said leached SFCC catalyst and to obtain a treated SFCC catalyst;
   (c) heating said treated SFCC catalyst in a thermal treatment unit to further remove residues of contaminant metals and to obtain a recovered FCC catalyst and gaseous components, wherein said thermal treatment unit is separate from said buffer unit and said recovery reactor unit;
   (d) collecting, storing said gaseous components from said thermal treatment unit in a gas storage separate from said recovery reactor unit, said buffer unit, and said thermal treatment unit; and
   (e) controlling an input/output of said steps (a) to (d) using internet of thing (IoT)-based valve and sensors placed between said gas storage, said recovery reactor unit, said buffer unit, and said thermal treatment unit.

2. The method of claim 1, wherein said reflux operation further comprises the steps of: (i) heating said organic acid solution to a predetermined temperature and a predetermined time period to yield vapors of said organic acid solution in said recovery reactor unit; (ii) condensing said vapors of said organic acid solution into an organic acid solution liquid form and transferring said organic acid solution liquid form to a reflux container; and (iii) returning said organic acid solution liquid form to said recovery reactor unit for further treating said SFCC catalyst.

3. The method of claim 2 wherein said SFCC catalyst has a particle size is at least 40 micrometers.

4. The method of claim 2 wherein said predetermined temperature is from 90° C. to 120° C. and said predetermined amount of time is in from 30 minutes to 90 minutes.

5. The method of claim 2 wherein said organic acid solution has a pH level from 1 to 2.

6. The method of claim 2 wherein said organic acid solution is selected from a group consisting of citric acid ($C_8H_8O_7$), oxalic acid ($C_2H_2O_4$), and gluconic acid ($C_6H_{12}O_7$).

7. The method of claim 6 wherein said oxalic acid has a concentration in said organic acid solution from 0.2M to 1M.

8. The method of claim 2 wherein a ratio of said SFCC catalyst and said organic acid solution is from 4 g/ml to 6 g/ml.

9. The method of claim 2 wherein said step (c) of heating said treated SFCC catalyst further comprises drying said treated SFCC catalyst at a temperature from 100° C. to 120° C. and then calcining said SFCC catalyst at a temperature from 500° C. to 600° C.

10. The method of claim 2 wherein said step (iii) of returning said organic acid solution liquid form to said recovery reactor unit in said reflux operation further comprises evenly distributing said organic acid solution liquid form to said SFCC by using an array of acid tubes placed inside said recovery reactor unit parallel to one another; and an array of reflux tubes placed inside said recovery reactor unit and parallel to one another; wherein each of said array of reflux tubes are positioned next to each of said acid tubes.

11. A System for recovering of spent fluid catalytic cracking (SFCC) catalyst in an oil refinery plant, comprising:
   (a) a recovery reactor unit where said SFCC catalyst is reacted with an organic acid solution in a predetermined temperature and in a predetermined time to obtain a leached SFCC catalyst;
   (b) a second unit, in fluid communication with said recovery reactor unit, configured to store vapors of said organic acid solution;
   (c) a condenser unit, in fluid communication with said buffer unit, configured to condense said vapors of said organic acid solution into said organic acid solution in a liquid form;
   (d) a washing and filtering unit, in communication with said recovery reactor unit, configured to wash and filter said leached SFCC catalyst to obtain a treated SFCC catalyst; and
   (e) a heating chamber, in communication with said washing and filtering unit, configured to provide thermal treatment of said treated SFCC catalyst to obtain a recovered FCC catalyst and gaseous components;
   (f) a gas storage, in fluid communication with said recovery reactor unit, configured to collect said gaseous components; and
   (g) a first Internet of thing (IoT) based valve between said buffer unit and said recovery reactor unit for controlling a reflux of said organic acid solution in said liquid form back to said recovery reactor unit.

12. The system of claim 11 wherein said recovery reactor unit further comprises:
   an array of acid tubes placed inside said recovery reactor unit parallel to one another; and
   an array of reflux tubes placed inside said recovery reactor unit and parallel to one another; wherein each of said array of reflux tubes are positioned next to each of said acid tubes.

13. The system of claim 12 further comprising:
   (h) a leachate tank, in fluid communication with said recovery reactor unit, configured to collect leachates and excess of said organic acid solution; and a second internet of thing (IoT) based valve between said leachate tank and said recovery reactor unit for controlling the input/output of said leaches and excess organic solution.

14. The system of claim 13 further comprising:
(j) a contaminant metals collector, in communication with said washing and filtering unit, configured to collect residues of said contaminant metals and salts of said contaminant metals; and
(k) a third internet of thing (IoT) controlled valve between said washing and filtering unit and said contaminant metals collector, configured to control the input/output of residues of said contaminant metals and said salts of said contaminant metals.

15. The system of claim 14 wherein said recovery reactor unit further comprises:
an output door, mechanically connected to said recovery reactor unit, operable to transfer said leached SFCC catalyst from said recovery reactor unit to said washing and filtering unit.

16. The system of claim 14 further comprising:
(n) a first plurality of sensors, coupled to said recovery reactor unit, operable to sense said predetermined temperature of said recovery reactor unit;
(o) a second plurality of sensors, coupled to said recovery reactor unit, operable to sense an acid concentration of said organic acid solution; and
(p) a third plurality of sensors, coupled to said heating chamber, operable to sense temperatures inside said heating chamber.

17. The system of claim 16 further comprising:
(o) a controller; electrically coupled to said first IoT-based valve, said second IoT-based valve, said third IoT-based valve, said first plurality of sensors, said second plurality of sensors, and said third plurality of sensors; operable to control a recovery process of said system.

18. The system of claim 12 wherein each of said array of acid tubes further comprises a plurality of acid dispensing holes configured to release said organic acid solution; and wherein each of said array of reflux tubes further comprises a plurality of reflux dispensing holes configured to release said reflux back to said SFCC.

19. The system of claim 12 wherein said recovery reactor unit further comprises an array of transverse plates intersecting perpendicular to an array longitudinal plates, said array of transverse plates and said array of longitudinal plates configured to divide an interior space of said recovery reactor unit into smaller sections.

20. The system of claim 19 wherein said heating chamber further comprises:
a microwave heating device operable to dry said treated SFCC catalyst at a temperature from 100° C. to 120° C.; and
calcining device operable to calcine said treated SFCC catalyst at a temperature from 500° C. to 600° C.

* * * * *